United States Patent
Kurr et al.

[11] Patent Number: 5,529,026
[45] Date of Patent: Jun. 25, 1996

[54] REGULATING VALVE

[75] Inventors: Klaus Kurr, Weinheim; Karl-Heinz Spies, Birkenau; Wolfgang Krause, Waibstadt all of Germany

[73] Assignee: Firma Carl Freudenberg, Weinheim, Germany

[21] Appl. No.: 448,058

[22] Filed: May 23, 1995

Related U.S. Application Data

[62] Division of Ser. No. 279,325, Jul. 22, 1994.

[30] Foreign Application Priority Data

Jul. 23, 1993 [DE] Germany .......................... 43 24 749.0

[51] Int. Cl.⁶ .................................................... B60H 1/02
[52] U.S. Cl. ........................................ 123/41.1; 236/34.5
[58] Field of Search ........................ 123/41.1; 236/34.5; 137/625.46, 625.47; 251/208, 317

[56] References Cited

U.S. PATENT DOCUMENTS

| | | | |
|---|---|---|---|
| 1,725,337 | 8/1929 | Burkhard | 137/625.47 X |
| 3,883,113 | 5/1975 | Kolb | 251/317 X |
| 4,195,777 | 4/1980 | Ikebukuro et al. | 123/41.1 X |
| 4,262,880 | 4/1981 | Danko et al. | 251/317 X |
| 4,427,057 | 1/1984 | Bouvot | 123/41.1 X |
| 4,479,513 | 10/1984 | Koch et al. | 137/625.47 |
| 4,627,567 | 12/1986 | Thorn | 123/41.1 X |

FOREIGN PATENT DOCUMENTS 2632476  1/1978  Germany .

*Primary Examiner*—John C. Fox
*Attorney, Agent, or Firm*—Kenyon & Kenyon

[57] ABSTRACT

A regulating valve, comprising a housing having a cylindrical valve chamber, is disclosed. The valve chamber is provided with at least one inflow and at least two outflow ports. The inflow and the outflow ports can be at least partly closed off as required by a single common valve body arranged in the valve chamber that can rotate about an axis. The valve body acts as a rotary valve and can be actuated by a drive. The inflow and/or at least one of the outflow ports is surrounded on the side of the housing facing the valve body by a seal. The seal can be brought into sealing engagement with the valve body under an elastic preload. The valve body has an extension in the peripheral direction of the valve chamber that is delimited in each case by an edge, such that the flowoff edge passing over the inflow port while it is opening has an axially extending elliptical indentation.

1 Claim, 6 Drawing Sheets

REGULATING VALVE

This is a division of application Ser. No. 08/279,325, filed 22 Jul. 1994.

BACKGROUND OF THE INVENTION

The invention relates generally to a regulating valve of the type comprising a housing with a cylindrical valve chamber that has at least one inflow port and at least two outflow ports. The inflow and the outflow ports of this type of valve can be at least partly closed off as required by a common valve body that can rotate about an axis arranged in the valve chamber. The valve body is configured as a rotary valve, and can be actuated by a drive. The inflow and/or at least one of the outflow ports is surrounded on the side of the housing facing the valve body by a seal, which can be brought into sealing engagement with the valve body under elastic preload.

A regulating valve of this kind is described in DE-OS 26 32 476, the contents of which are incorporated herein by reference. The regulating valve is configured as a flowthrough medium control valve and is used in a mixer tap to mix cold and hot water. Both the inlets and the outlets are arranged displaced from one another, the inlets and outlets being arranged at right angles to one another. However, because of the strong acceleration of the flow at the flowoff edge of the valve body, the actuation forces encountered when opening the inflows are considerable, since the suction effects which occur during opening act on the valve body so as to close the valve. Hence, the drive required by such a valve must be designed with sufficient strength to overcome the suction forces, which is economically disadvantageous and which compromises the goal of providing a valve having compact dimensions.

SUMMARY OF THE INVENTION

This invention is directed to the further development of a regulating valve of the aforesaid general type having more consistent opening characteristics such that the actuation forces of the valve body to open the inflow are substantially reduced. Thanks to such changes, the drive need not be as strong as in prior devices, and is therefore more economical and more compact, for optimal actuation of the valve body.

In the present invention, provision is made for the valve body to have an extension in the peripheral direction of the valve chamber that is delimited in each case by an edge, and for the flowoff edge over which inflow passes whilst open to have an elliptical indentation extending in the axial direction. An advantage of this design is that it prevents sudden, strong acceleration of the flow at the flowoff edge of the valve body when the inflow is opened, thereby greatly reducing any suction effects which would otherwise tend to act on the valve body so as to close the valve. The static pressure acting on the valve body remains almost constant while the inflow of the regulating valve of the invention is being opened, resulting in uniform opening characteristics from the initial opening of the inflow until the entire opening cross section is uncovered. The elliptical shape of the indentation is especially advantageous in that, as it is rotated, past the port, only a very small passthrough cross section is initially uncovered, so that the static pressure and the actuation force during the opening process remains largely constant until the entire cross section of the inflow port is uncovered.

According to one advantageous embodiment, the indentation can be located along an intermediate portion of the valve body so that it is axially spaced from the axial ends of the valve body. This improves guidance of the valve body in the housing, especially in the region of the elliptically indented flowoff edge. This embodiment reliably eliminates jamming of the valve body in the housing.

The valve body can be actuated by an electrically driven stepping motor, the stepping motor preferably being connected in a signal-carrying manner to an electronic control device. The passthrough cross sections through the inflow and/or outflow can be adjusted on the basis of predefined parameters that are stored in the control device (e.g., in the form of a characteristics diagram). The regulating valve of the invention can be arranged in liquid circuits in order to switch various mutually connecting subsidiary portions of the fluid circuit. Actuation of the valve body with an electrically driven stepping motor is particularly advantageous for such applications, since especially precise regulation of the fluid flow as a function of the characteristic data in the control device can be achieved. Actuation of the valve body by electromagnetically, pneumatically, or hydraulically driven positioning elements is comprehended by this invention. For example, the valve can be actuated in a particularly simple and economically cost-effective manner by means of a shape memory element, in which case the valve body uncovers the passthrough cross section through the inflow and/or outflows as a function of the temperature applied to the shape memory element.

The inflow port and the outflow ports can be brought into sealed engagement with the valve body, the seals being subject to both a static and a dynamic load. Seals that are subject during their entire service life only to negligible abrasive wear, and which consequently exhibit good utilization characteristics during their entire service life are particularly advantageous when the valve body is to be frequently actuated. To achieve excellent sealing results during the entire service life, the seal can consist of an annular molded seal element made of polytetrafluoroethylene (i.e., PTFE), which can be supported on a side facing away from the valve body, with elastic resilience in the axial direction of the molded seal, on a spring element. Even while this arrangement provides excellent sealing of the inflow and/or outflows with respect to the valve body, it also provides for the smooth relative movement of the rotatable valve body with respect to its housing and seals. Because of the elastic resilience of the molded seal in the axial direction, the PTFE molded seal can be optimally associated in sealing engagement with the valve body even when it is not possible to precisely concentrically relate the geometry of the housing to the valve body due to errors or uncertainties in the manufacture or assembly process.

The spring element can be an O-ring made of elastomeric material. O-rings are inexpensive components that are available in almost all desired dimensions, and weigh very little in comparison with other spring elements. Hence, the regulating valve of the invention has, as a whole, a comparatively low inherent weight, and can be produced in large quantities at a favorable price.

The housing can have one inflow and three outflows. This configuration is particularly appropriate where the regulating valve is utilized within the cooling system of an internal combustion engines. When the regulating valve is used as part of the liquid cooling system of an internal combustion engine, the valve inflow port is fluidically connected to the cooling water outlet of the internal combustion engine. The valve outflow ports are connected to the radiator circuit, the bypass circuit, and the circuit for the vehicle interior heating system. The alignment of the various ports about the valve element is selected in conjunction with the valve element geometry to permit certain particularly useful patterns of fluid flow and port occlusion. For example, the inflow port can be aligned in the peripheral direction of the valve chamber with the outflow port to the radiator circuit on the one hand and the outflow to the interior heating circuit on the other hand. The inflow and the outflows of the radiator and the interior heating system can simultaneously be completely closed off. Furthermore, the outflow to the bypass circuit can be completely closed off by the valve body only when the inflow and the outlets adjacent on either side in the peripheral direction are completely open to flow. Utilization of the regulating valve according to the invention yields a design for a liquid cooling system for internal combustion engines that requires a minimal number of parts. Only one regulating valve is used to make all the circuits of the cooling system open to flow as a function of, for example, the component temperature of the cylinder head and/or the coolant temperature. The passthrough cross section through the inflow port into the valve chamber and through the outflow ports from the valve chamber into the adjacent circuits can easily be adjusted in accordance with the particular conditions of the application by the steplessly actuated valve body. When the regulating valve is utilized in the liquid cooling system of an internal combustion engine, it has proven to be advantageous for the valve body to be provided with a return spring that automatically returns it, in the event of engine failure, into a position in which no damage occurs to the attached engine. Such a position is implemented, for example, when the valve body completely uncovers the inflow into the valve chamber and the outflow to the radiator and the vehicle interior heating system, and completely closes off the bypass circuit. This reliably rules out any overheating of the engine. Integration of the heating circuit into the coolant mixing valve makes it possible to prevent coolant circulation during the warmup phase, since during warmup, any circulation of the coolant in the vehicle interior heating circuit is prevented. The regulating valve can be driven, for example, by an electrically driven stepping motor that is connected in a signal-carrying manner to the electronic engine controller. The coolant temperature can be set, during operation of the internal combustion engine, to values appropriate to requirements on the basis of parameters that are stored in characteristics diagrams in the electronic engine controller. Fuel consumption and emissions can thereby be reduced. It is also possible to regulate component temperatures, for example to regulate the temperature of the cylinder head.

DETAILED DESCRIPTION

Figure 1:
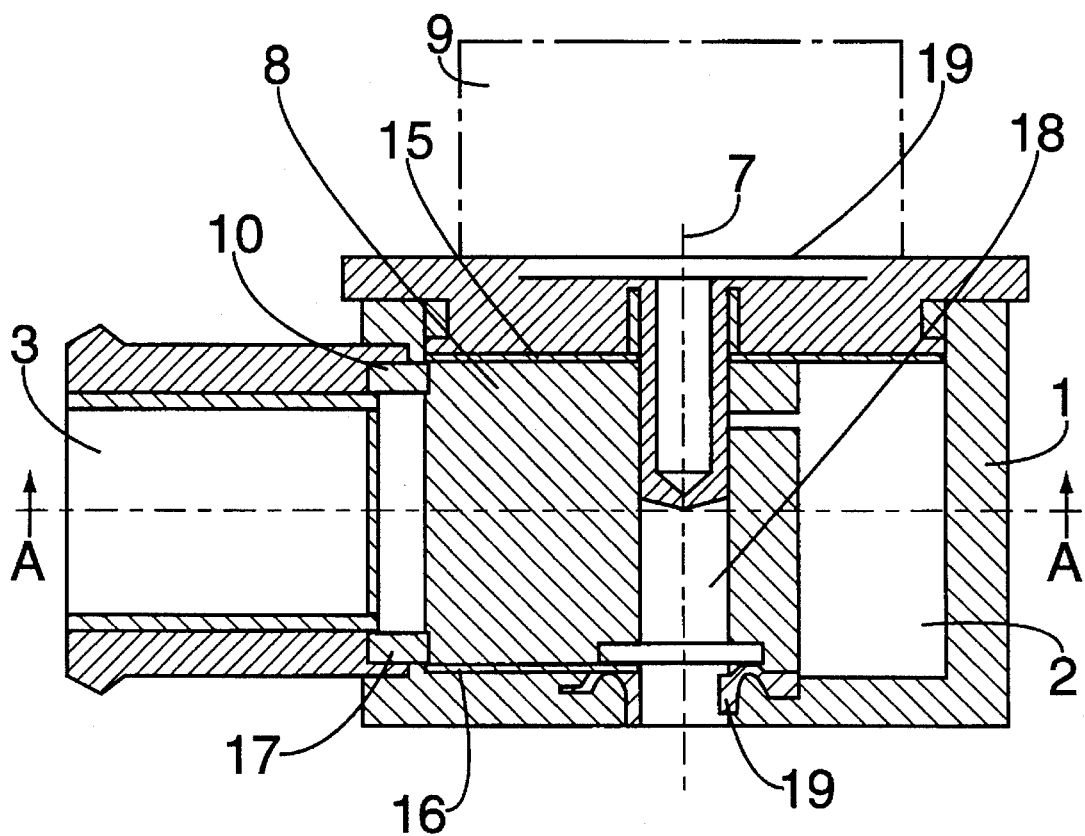
FIG. 1 is a longitudinal sectional view of an embodiment of a regulating valve constructed according to the principles of the invention.

FIG. 1 shows an exemplary embodiment of a regulating valve constructed according to the principles of the invention that is used to regulate the mass flow of coolant through a liquid cooling system of an internal combustion engine.

The regulating valve generally comprises a hollow cylindrical housing 1 that encloses a valve chamber 2, a valve body 8 being arranged inside valve chamber 2. Valve body 8 is nonrotatably joined to a drive shaft 19, and can be rotated about axis 7 by means of a drive 9, here indicated symbolically. Valve chamber 2 is sealed with respect to the environment and valve body 8. The connections to housing 1, which consist of an inflow port 3 and three outflow ports (depicted in FIGS. 2–5), are provided as connector tubes that are joined in liquid-tight fashion to housing 1. The connector tubes are sealed with respect to valve body 8, on the side facing valve body 8, by means of a seal 10 that is produced as a molded polytetrafluoroethylene (PTFE) part. Seal 10 is supported, with elastic resilience in the axial direction of the tube, on a spring element 17 configured as an O-ring. Drive shaft 18 is guided within housing 1 in slide bushings 19, to ensure the relative movability of valve body 8 with respect to housing 1 with the least possible friction.

Figure 2:
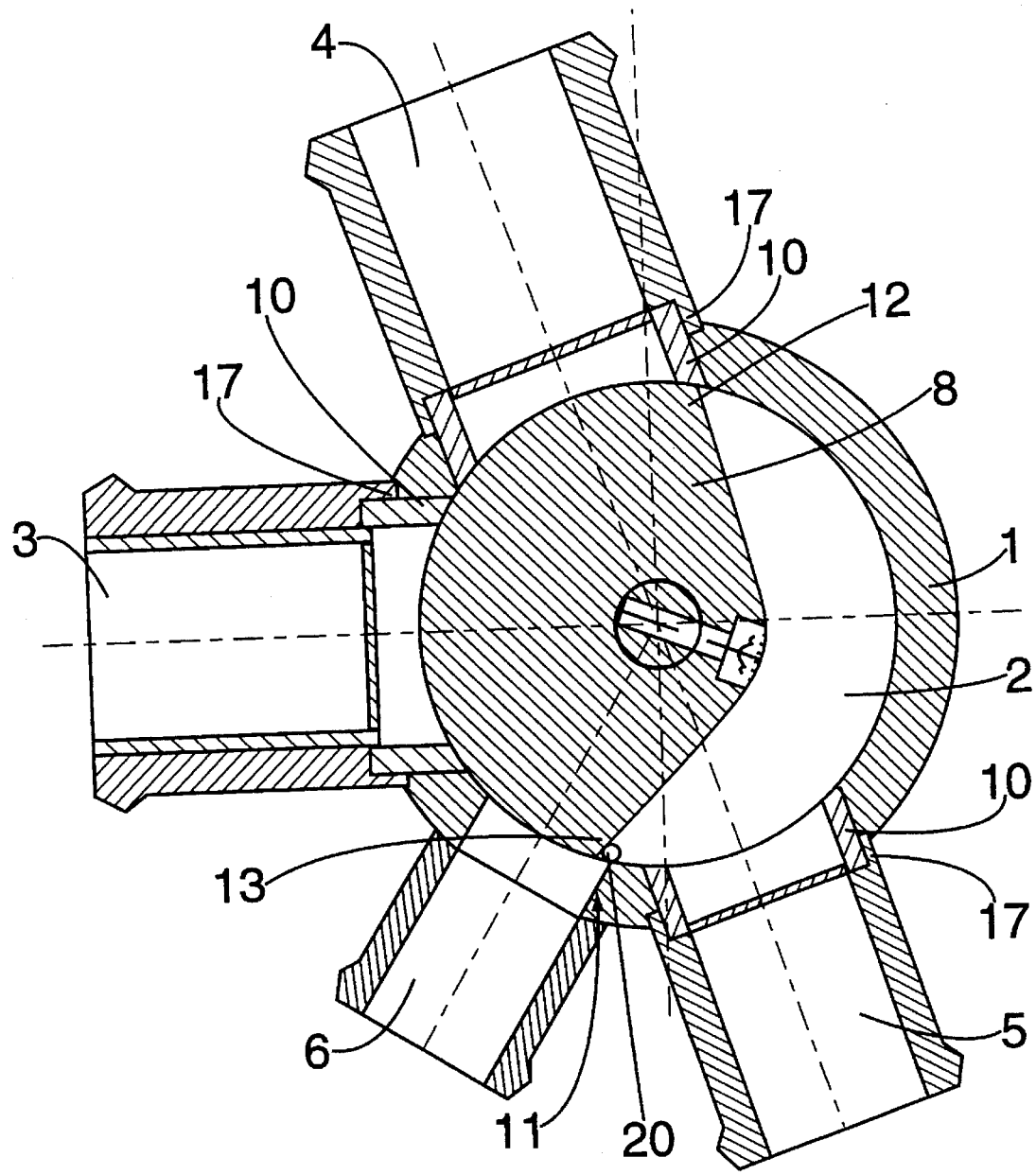
FIGS. 2 to 5 show the regulating valve as viewed from section A—A FIG. 1, in various settings.

FIG. 2 shows the regulating valve shown in FIG. 1, in cross-section, as seen along a plane orthogonal to the plane of FIG. 1. The regulating valve is provided with an inflow port 3 that, in this embodiment, is fluidically connected to the cooling water outlet of an internal combustion engine (not shown). Outflows 4, 5, and 6 connect valve chamber 2 to a radiator circuit, a bypass circuit, and a vehicle interior heating circuit of a cooling system. A stop 20 is provided to limit the rotation of valve body 8. Because of the elastic resilience of the spring elements 17, configured as O-rings, the PTFE seals 10 of inflow 3 and outflow 4 are in sealing engagement, with elastic preload, with the surface of valve body 8. The operating state depicted here, in which coolant inflow through inflow 3 is blocked so that coolant cannot circulate through the cooling system of the internal combustion engine, results in a short warmup phase and rapid heating of the internal combustion engine after a cold start.

Figure 3:
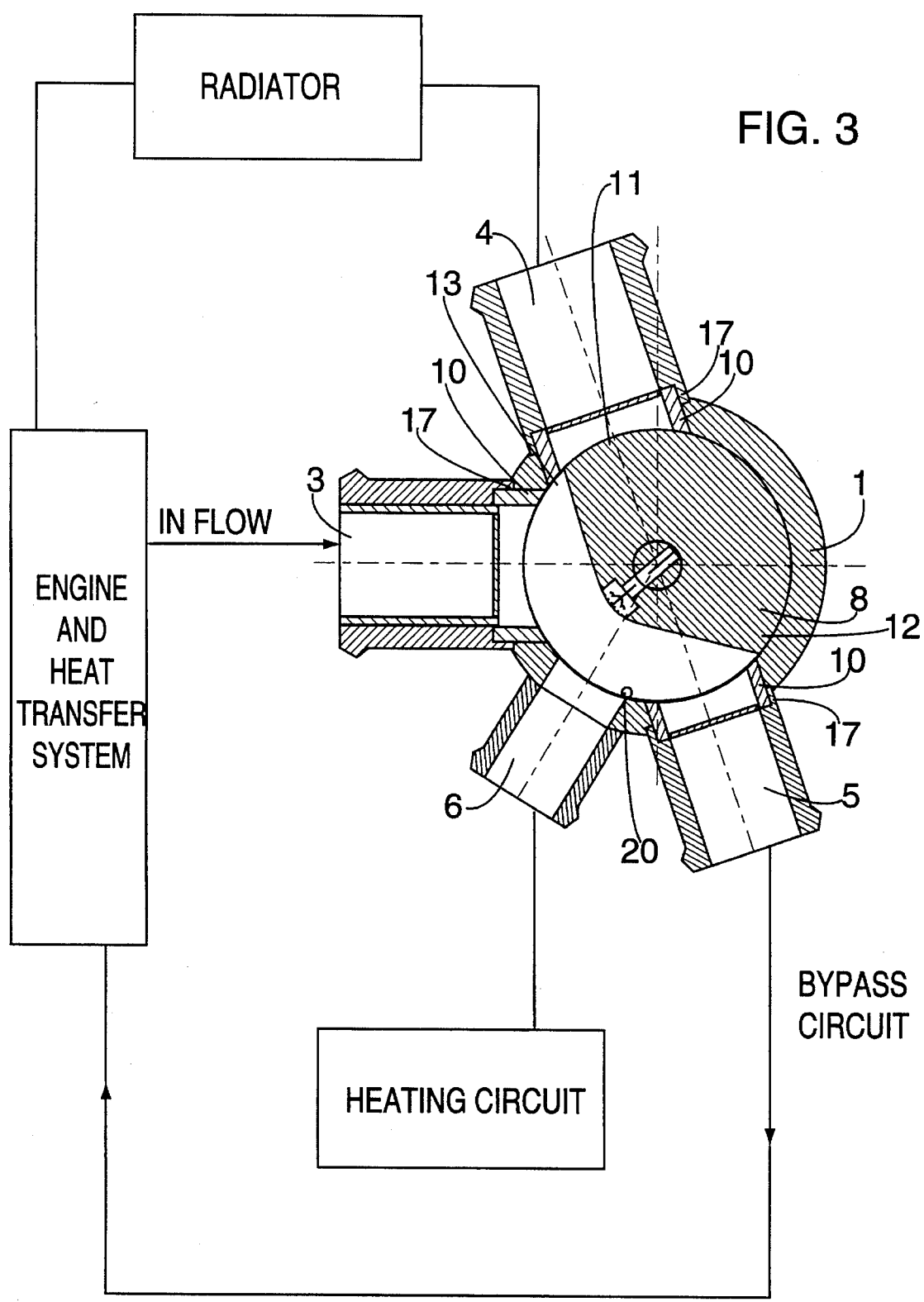

As the coolant or engine heat up, valve body 8 moves clockwise from stop 20 so as to open inflow port 3, until the entire opening cross section of inflow 3 is uncovered. The geometry of valve body 8 and the arrangement of inflow 3 relative to outflows 4, 5, and 6 means that with inflow 3 completely open, outflow 5 to the bypass circuit and outflow 6 to the heating circuit are also completely open (FIG. 3). Outflow 4 to the radiator circuit is closed off by valve body 8, to further promote rapid heating of the engine to the optimum operating temperature.

Figure 4:
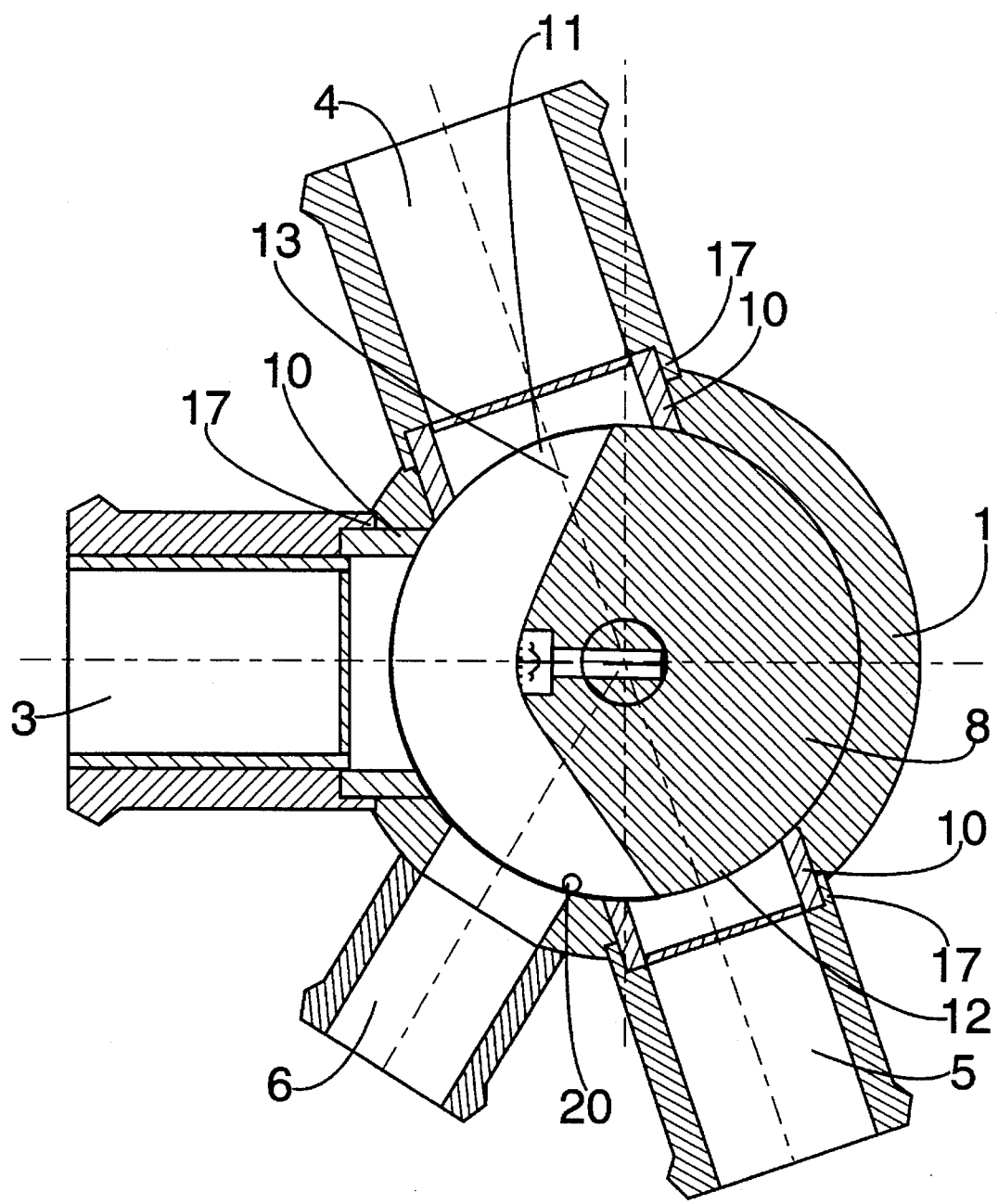

As the temperature of the internal combustion engine increases further, valve body 8 is further rotated clockwise by drive 9 until edge 11, which includes flowoff edge 13, uncovers part of the cross section of outflow 4 and edge 12, lying opposite in the peripheral direction, closes off a part of outflow 5 to the bypass circuit (FIG. 4). A portion of the coolant circulating in the cooling system passes through outflow 4 into the radiator, and having been cooled is then conveyed back to the internal combustion engine.

Figure 5:
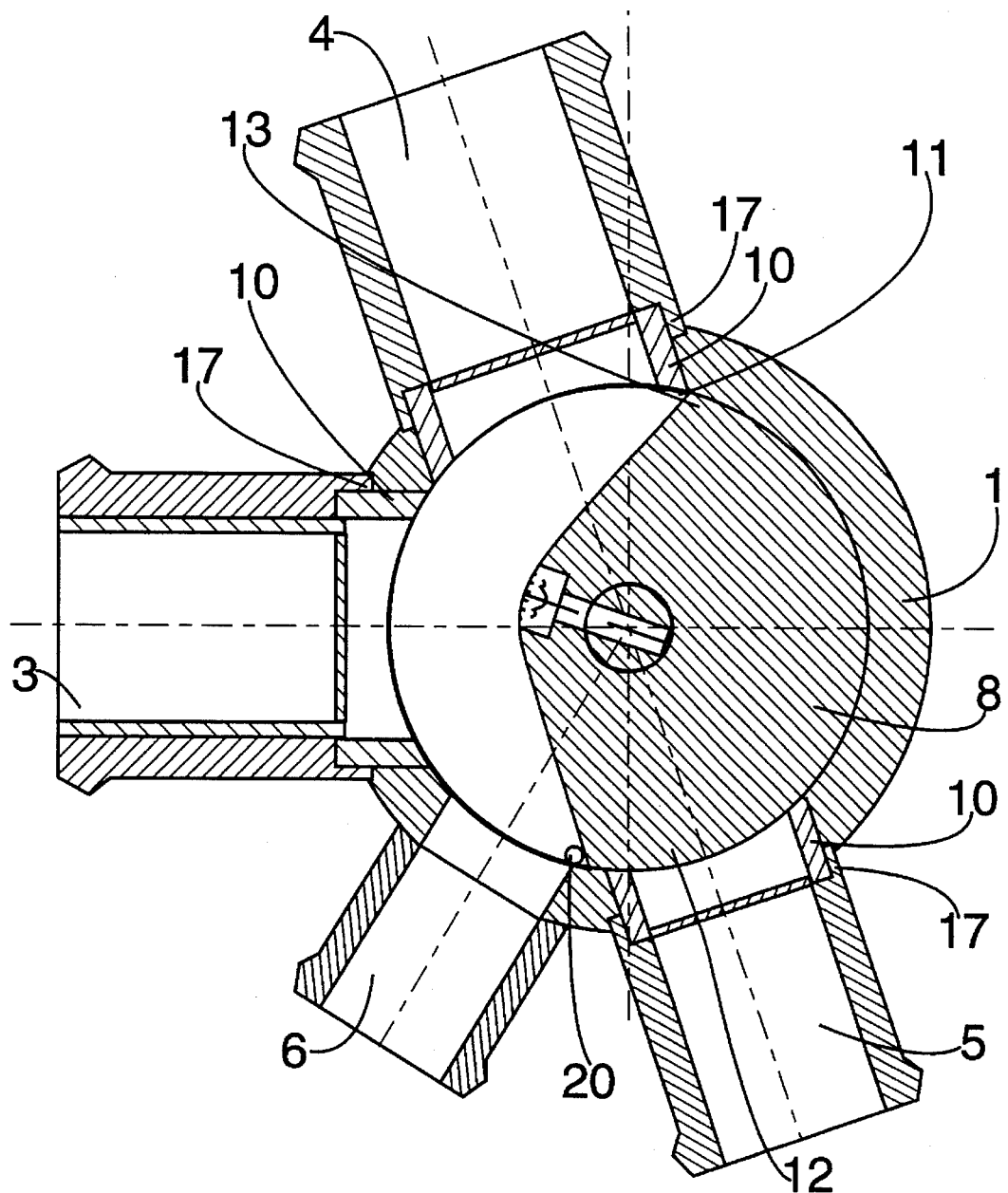

FIG. 5 shows the operating state of the regulating valve that exists, for example, when the internal combustion engine is being operated at full load and maximum cooling performance is required. Edge 12 of valve body 8 is in engagement with stop 20, and completely covers and seals outflow 5 to the bypass circuit. To achieve maximum cooling performance, outflow 4 to the radiator is completely open. In this operating state, the coolant fed into the regulating valve through inflow 3 is distributed partly to the vehicle interior heating circuit and partly to the radiator circuit.

Figure 6:
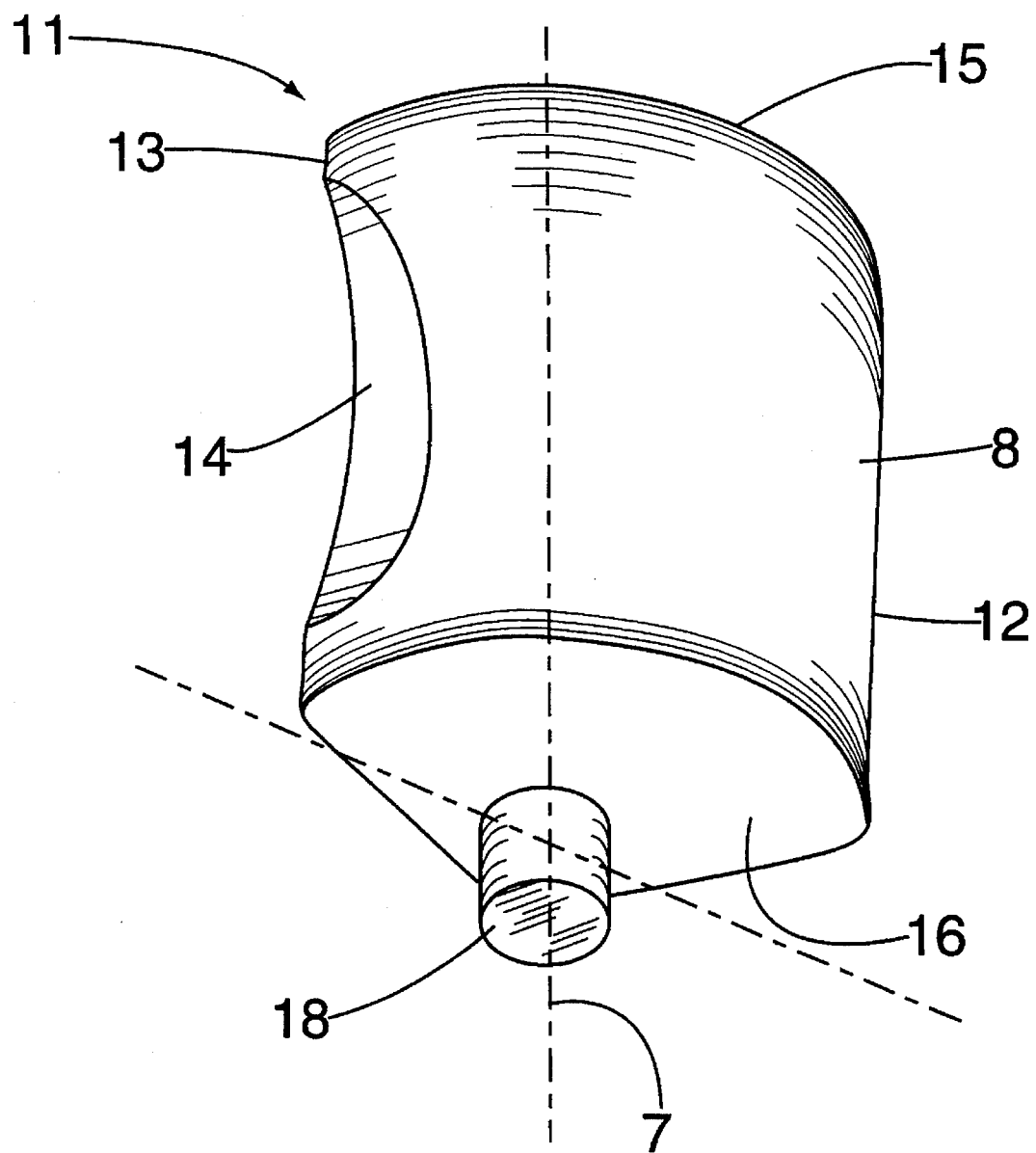
FIG. 6 is a perspective view of the valve body of the regulating valve of FIG. 1 shown as an individual part.

FIG. 6 shows an exemplary embodiment of a valve body 8 that is used in the regulating valve described above. Edge 11, which is configured as flowoff edge 13, has an elliptical indentation 14 that extends in the axial direction between the axial delimitations 15, 16 of valve body 8. Starting from the operating state of the regulating valve depicted in FIG. 2, valve body 8 is moved clockwise and, as depicted in FIG. 3, gradually uncovers inflow 3. To prevent a sudden enlargement in cross section when inflow 3 is opened, causing an abrupt acceleration of the flow and thus a reduction in static pressure, flowoff edge 13 is provided with an elliptical indentation. This eliminates suction effects as inflow 3 is opened (which would tend to cause a torque on valve 8 against the opening direction). The elliptical indentation 14 provides uniform valve opening characteristics while requiring comparatively low actuation forces from the drive 9.

What is claimed is:

1. A liquid cooling system for an internal combustion engine, comprising:

an internal combustion engine and heat transfer system having a cooling water outlet, a radiator circuit, a bypass circuit, and a circuit for a vehicle interior heating system;

a housing defining a cylindrical valve chamber, said valve chamber having a periphery, one inflow port and three outflow ports, wherein i) the inflow port is connected in a fluid-carrying manner to the cooling water outlet of the internal combustion engine;

ii) the outflow ports are connected to the radiator circuit, the bypass circuit, and the circuit for the vehicle interior heating system; and iii) the inflow port is located along the periphery of the valve chamber housing in between the outflow port leading to the radiator circuit and the outflow port leading to the vehicle interior heating circuit;

a valve body rotatable within the cylindrical valve chamber about an axis, said valve body defining a surface comprising axially displaced ends and a flowoff edge, said flowoff edge comprising an axially extending elliptical indentation, said valve body being operable to close off the inflow and outflow ports in a predetermined pattern by rotation of the valve body about the axis so that the inflow port and the outflow ports leading to the radiator and the interior heating circuits can together be completely closed off simultaneously, and the outflow port leading to the bypass circuit is completely closed off by the valve body only when the inflow port, the radiator circuit port and the vehicle interior heating system circuit port are completely open to flow.

* * * * *